(12) United States Patent
Ou

(10) Patent No.: US 12,703,016 B2
(45) Date of Patent: Aug. 11, 2026

(54) LABEL REMOVING MACHINE

(71) Applicant: ZHEJIANG BORETECH ENVIRONMENTAL ENGINEERING CO., LTD., Zhejiang (CN)

(72) Inventor: Che-wen Ou, Zhejiang (CN)

(73) Assignee: ZHEJIANG BORETECH ENVIRONMENTAL ENGINEERING CO., LTD., Pinghu (CN)

( * ) Notice: Subject to any disclaimer, the term of this patent is extended or adjusted under 35 U.S.C. 154(b) by 278 days.

(21) Appl. No.: 18/270,699

(22) PCT Filed: Aug. 30, 2022

(86) PCT No.: PCT/CN2022/115899

§ 371 (c)(1),
(2) Date: Jun. 30, 2023

(87) PCT Pub. No.: WO2023/030333

PCT Pub. Date: Mar. 9, 2023

(65) Prior Publication Data

US 2024/0075506 A1 Mar. 7, 2024

(30) Foreign Application Priority Data

Aug. 30, 2021 (CN) ......................... 202111005423.9
Aug. 30, 2021 (CN) ......................... 202122086385.6

(51) Int. Cl.
*B08B 9/08* (2006.01)
*B29B 17/02* (2006.01)

(52) U.S. Cl.
CPC ............ *B08B 9/083* (2013.01); *B08B 9/0808* (2013.01); *B08B 9/0821* (2013.01); *B29B 17/02* (2013.01);

(Continued)

(58) Field of Classification Search
CPC ..... B08B 9/083; B08B 9/0808; B08B 9/0821; B08B 2209/08; B08B 3/14; B29B 17/02;
(Continued)

(56) References Cited

U.S. PATENT DOCUMENTS 3,893,634 A 7/1975 Schmidt
4,222,865 A * 9/1980 Valeri .................. B01D 33/067
209/407

(Continued)

FOREIGN PATENT DOCUMENTS

CN 202029274 U 11/2011
CN 203527697 U 4/2014

(Continued)

OTHER PUBLICATIONS

Machine Translation of Ou, CN111589813A, Aug. 28, 2020 (Generated Aug. 8, 2025), Espacenet (Year: 2020).*

(Continued)

*Primary Examiner* — Andrew L Swanson
(74) *Attorney, Agent, or Firm* — Juan Carlos A. Marquez; Marquez IP Law Office, PLLC

(57) ABSTRACT

The present invention discloses a label removing machine. The label removing machine includes a base, a feeding seat and a supporting seat being disposed on the base, an outer cylinder being disposed between the feeding seat and the supporting seat, a rotary drum being disposed in the outer cylinder, moving blade components being disposed on an outer wall of the rotary drum, the outer cylinder including a supporting frame, a plurality of fixed blade plates being detachably connected to the supporting frame in the circumferential direction, and a plurality of fixed blade components being detachably connected to the fixed blade plates.

17 Claims, 8 Drawing Sheets

(52) U.S. Cl.
CPC ... *B08B 2209/08* (2013.01); *B29B 2017/0217* (2013.01)

(58) Field of Classification Search
CPC .... B29B 2017/0217; B29B 2017/0224; B07B 1/4609
See application file for complete search history.

(56) References Cited

U.S. PATENT DOCUMENTS

| | | | | |
|---|---|---|---|---|
| 5,203,359 | A * | 4/1993 | Fesmire | B08B 3/042<br>134/120 |
| 6,752,192 | B2 * | 6/2004 | Francis | B08B 7/02<br>134/32 |
| 2015/0033927 | A1 * | 2/2015 | Ou | B26D 1/0006<br>83/667 |

FOREIGN PATENT DOCUMENTS

| | | | | | |
|---|---|---|---|---|---|
| CN | 106140411 | A | | 11/2016 | |
| CN | 111589813 | A | * | 8/2020 | B08B 9/38 |
| CN | 113696378 | A | | 11/2021 | |
| CN | 113858485 | A | | 12/2021 | |
| CN | 216230247 | U | | 4/2022 | |
| CN | 216267037 | U | | 4/2022 | |
| DE | 1607520 | A1 | * | 9/1969 | |

OTHER PUBLICATIONS

Machine Translation of Schlecte, DE1607520A1, Sep. 18, 1969 (Generated Aug. 8, 2025), Espacenet (Year: 1969).*
PCT International Search Report mailed Nov. 18, 2022 in counterpart PCT application PCT/CN2022/115899, 3 pages in English.
European Extended Search Report mailed Nov. 12, 2024 in counterpart European application 22863468.9, 10 pages in English.

* cited by examiner

LABEL REMOVING MACHINE

CROSS-REFERENCE TO RELATED APPLICATION

This application is a national stage application filed under 35 U.S.C. 371 of International Application No. PCT/CN2022/115899 filed Aug. 30, 2022, which claims priority to China Patent Application 202122086385.6 filed Aug. 30, 2021, and China Patent Application 202111005423.9 filed Aug. 30, 2021. The disclosures of the above applications are incorporated herein by reference in their entireties.

FIELD OF THE INVENTION

The present invention relates to a machine for plastic recycling, in particular to a label removing machine.

BACKGROUND

At present, there are many kinds of plastic bottles, such as mineral water bottles, beverage bottles, tea water bottles and milk bottles. These plastic bottles usually have labels on the outside, and the labels are often made of plastic film. During recycling of such plastic bottles, firstly, the labels on the outside of the plastic bottles need to be removed, and then bottle bodies are washed and crushed to produce recycled plastic raw materials.

The function of a label removing machine is to remove the labels on the outside of the plastic bottles. An existing label removing machine includes a base, a feeding seat, and a supporting seat. An outer cylinder is disposed between the feeding seat and the supporting seat. A rotary drum is disposed in the outer cylinder. The rotary drum is connected to a motor and driven by the motor, and able to rotate inside the outer cylinder. An annular space is formed between the outer cylinder and the rotary drum. Moving blade components are disposed on an outer wall of the rotary drum, and fixed blade components are disposed on an inner wall of the outer cylinder. The fixed blade components are of a large quantity and are densely distributed on the inner wall of the outer cylinder. When the rotary drum rotates, the moving blade components on the rotary drum also rotate therewith, forming a relative movement with the fixed blade components on the inner wall of the outer cylinder. The feeding seat is provided with a feeding inlet and a feeding chamber, and the feeding chamber communicates with the annular space between the outer cylinder and the rotary drum inner cylinder. When plastic bottles are processed, the plastic bottles are fed from the feeding inlet on the feeding seat, and enter the annular space between the outer cylinder and the rotary drum inner cylinder via the feeding chamber, and labels outside the plastic bottles are torn off under the action of the fixed blade components and the moving blade components, so that the function of label removal is achieved.

After a period of use of the traditional label removing machine, the fixed blade components may be worn, so the fixed blade components need to be replaced. However, since the fixed blade components are of a large quantity, it is difficult to replace the fixed blade components one by one, and the replacement time is long.

SUMMARY OF THE INVENTION

The object of the present invention is to solve the problems that during replacement of fixed blade components of an existing label removing machine, since the fixed blade components are of a large quantity, it is difficult to replace the fixed blade components one by one, and the replacement time is long, and to provide a label removing machine which may effectively solve the above-mentioned problems and has the characteristics of long service life and low recycling loss when in use.

The object of the present invention is achieved by the following technical solutions: A label removing machine includes a base, a feeding seat and a supporting seat being disposed on the base, an outer cylinder being disposed between the feeding seat and the supporting seat, a rotary drum being disposed in the outer cylinder, moving blade components being disposed on an outer wall of the rotary drum, the outer cylinder including a supporting frame, a plurality of fixed blade plates being detachably connected to the supporting frame in a circumferential direction, a plurality of fixed blade components being detachably connected to the fixed blade plates.

In the present invention, a modular design concept is adopted for the outer cylinder: each fixed blade plate and the fixed blade components connected thereto form a module, so that when the fixed blade components need to be replaced, the whole module is directly replaced without replacing the fixed blade components one by one. Therefore, the replacement efficiency is greatly improved, the time required for replacement is shortened, and replacement is convenient. In practical use of a label removing machine, because the rotary drum rotates in one direction, operation is conducted through one sides of the fixed blade components, and the fixed blade components are generally unilaterally worn, that is, one sides of the fixed blade components are heavily worn, while the other sides are almost not worn. In order to prolong the service life of the fixed blade components and reduce the replacement frequency of the fixed blade components, in the use process of the present invention, when one sides of the fixed blade components are heavily worn, the fixed blade plates may be horizontally rotated by 180 degrees, and the less worn sides of the fixed blade components continue to be used for operation, thereby effectively prolonging the service life of the fixed blade components and reducing the replacement frequency of the fixed blade components. The modular design concept of the present invention greatly facilitates the above operation.

Preferably, the supporting frame includes two end plates, a plurality of cross beams parallel to one another are disposed between the two end plates, each of the fixed blade plates is connected between two immediately adjacent cross beams, and fixing mechanisms for fixing the fixed blade plates are connected to the cross beams. The two ends of each fixed blade plate are respectively connected to the two immediately adjacent cross beams, and are fixed by the fixing mechanisms.

Preferably, two sides of the cross beams are respectively provided with connecting flanges, and one ends of the fixed blade plates abut against the connecting flanges; each of the fixing mechanisms includes a batten and first bolts for connecting the batten to the corresponding cross beam, and a cross section of the batten is in a “U” shape; and the battens are provided with through holes allowing the first bolts to penetrate through, the cross beams are provided with threaded holes for connection to the first bolts, the first bolts penetrate through the through holes provided in the battens and are connected to the threaded holes in the cross beams, and the battens press one ends of the fixed blade plates against the connecting flanges. With the above-mentioned mechanism, the fixed blade plates are convenient to install and remove.

Preferably, second install handles are disposed on the battens. Since the second install handles are disposed on the battens, the battens are convenient to install and remove.

Preferably, stirring battens are disposed on the outer wall of the rotary drum. The cross section of each of the stirring battens is triangular, and the stirring battens are disposed in the axial direction of the rotary drum. The stirring battens may stir plastic bottles to reduce the occurrence of blocking.

Preferably, the feeding seat is provided with a feeding chamber and a feeding inlet connected to the feeding chamber, and wear-resistant plates are detachably connected to an inner wall of the feeding chamber. The wear-resistant plates cover the inner wall of the feeding chamber, and are detachably connected to the inner wall of the feeding chamber, so that the wear-resistant plates are convenient to replace.

Preferably, the wear-resistant plates are connected to the inner wall of the feeding chamber through second bolts.

Preferably, each of the fixed blade components includes a fixed blade and a cap nut, the fixed blade including a main body, a positioning platform being disposed on one side of the main body, and a cutter bit being disposed on the other side of the main body, studs being disposed on the positioning platforms, positioning through grooves matching the positioning platforms being provided in the fixed blade plates, the positioning platforms being connected to the positioning through grooves, the main body being located on one sides of the fixed blade plates, the cap nuts being connected to the studs on the other sides of the fixed blade plates. The main body is in a disk shape, and the side, close to the cutter bits, of the main body is spherical or quasi-spherical. The cross sections of the positioning platforms and the positioning through grooves are respectively square. A spacer is further disposed between each of the cap nuts and the fixed blade plate. The function of the cap nuts is to fix the fixed blades onto the fixed blade plates. In the operating process, the cutter bits are in contact with labels on the outside of the plastic bottles to tear the labels, so as to separate the labels from the bottles. Since the fixed blades are connected to the fixed blade plates by matching with the cap nuts, the fixed blades are convenient to install and remove. When one sides of the cutter bits on the fixed blades are worn, the worn sides of the cutter bits may be rotated to other angles by adjusting the angle of the fixed blades, and unworn portions of the cutter bits continue to be used for operation, so that the service life of the fixed blades is greatly prolonged, the replacement frequency of the fixed blades is reduced, and replacement costs are saved. Since the fixed blades match the positioning through grooves in the fixed blade plates via the positioning platforms disposed on the fixed blades, and the cross sections of the positioning platforms and the positioning through grooves are respectively square, the minimum adjustment angle of the fixed blades is 90 degrees. In a traditional label removing machine, label removing machine bolts serve as positioning components. The label removing machine bolts are directly connected to an outer cylinder, and the front ends of the label removing machine bolts directly extend into the outer cylinder for a certain distance. When plastic bottles are subject to label removal through this structure, the plastic bottles may form a strong impact with the label removing machine bolts, some portions of the plastic bottles are prone to being torn, and consequently small plastic fragments are produced and fall down, and a recycling loss is caused. According to the present invention, the structure of the fixed blades is optimized, where the main bodies of the fixed blades according to the present invention are each in a disk shape, and the sides, close to the cutter bits, of the fixed blades are spherical or quasi-spherical, so that the fixed blades have a small tearing effect on the plastic bottles and are not prone to tearing the plastic bottles. Therefore, less fragments fall down, and the recycling loss is reduced.

Preferably, the cutter bits are each of a rectangular parallelepiped structure.

Preferably, first install handles are disposed on the fixed blade plates. Since the first install handles are disposed on the fixed blade plates, the fixed blade plates are convenient to install and remove.

The present invention has the following beneficial effects: according to the present invention, a modular design concept is adopted for the outer cylinder: each fixed blade plate and the fixed blade components connected thereto form a module, so that when the fixed blade components need to be replaced, the whole module is directly replaced without replacing the fixed blade components one by one. Therefore, the replacement efficiency is greatly improved, the time required for replacement is shortened, and replacement is convenient.

BRIEF DESCRIPTION OF THE DRAWINGS

The accompanying drawings are provided for further understanding of this application and constitute part of the specification, and explain this application together with the following specific implementations, but do not constitute a limitation to this application. In the accompanying drawings.

DETAILED DESCRIPTION

The present invention will be further described by the following detailed description with reference to the accompanying drawings.

Example 1

Figure 1:
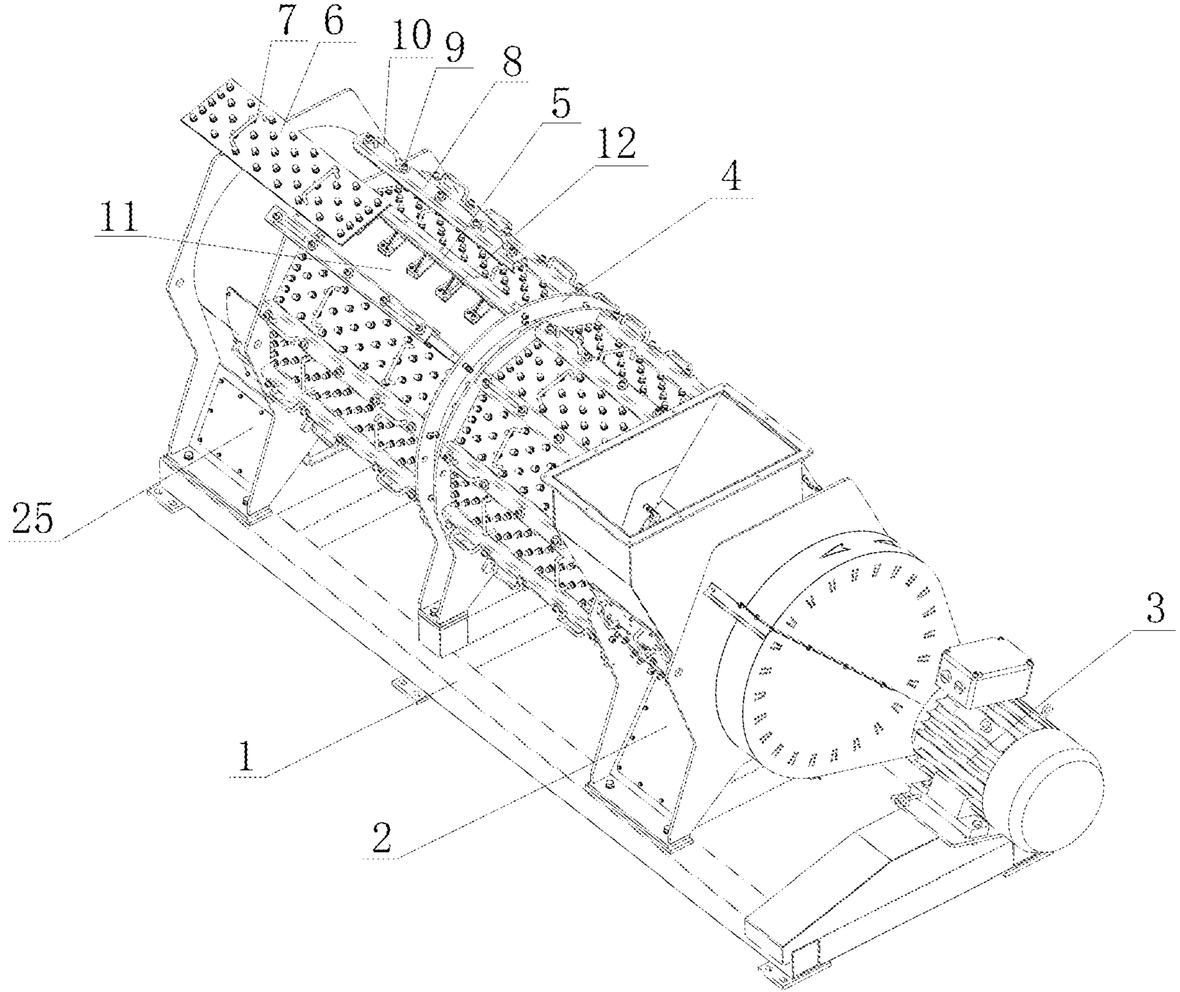
FIG. 1 is a schematic structural diagram of the present invention.
Figure 2:
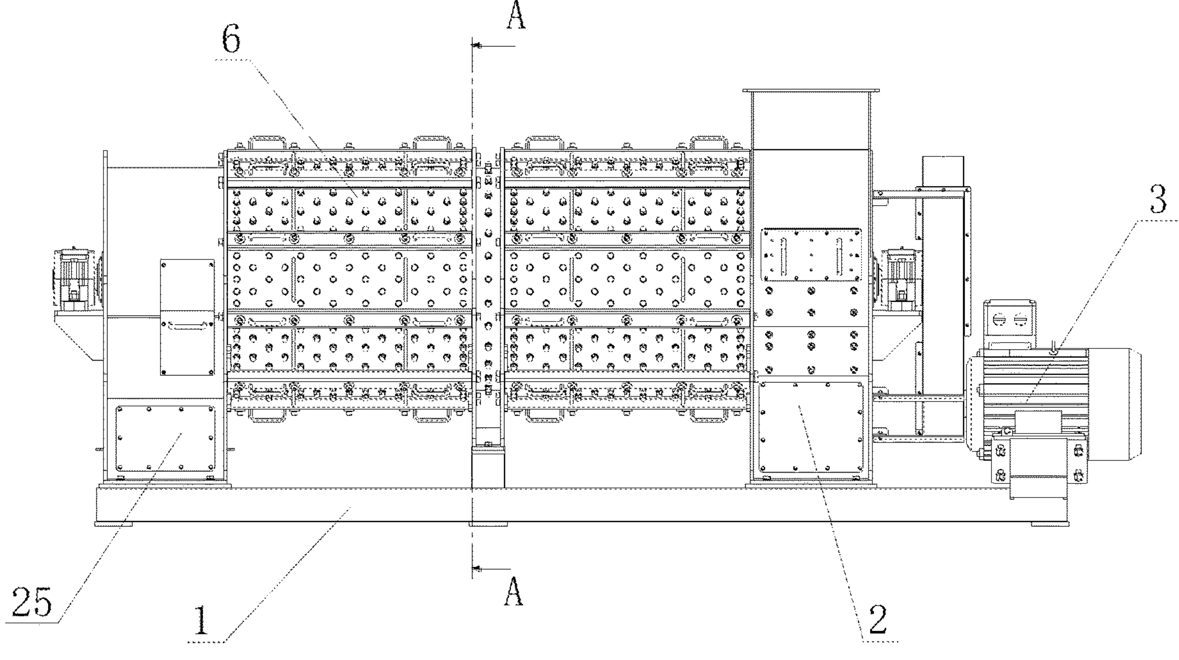
FIG. 2 is a front view of the present invention.
Figure 3:
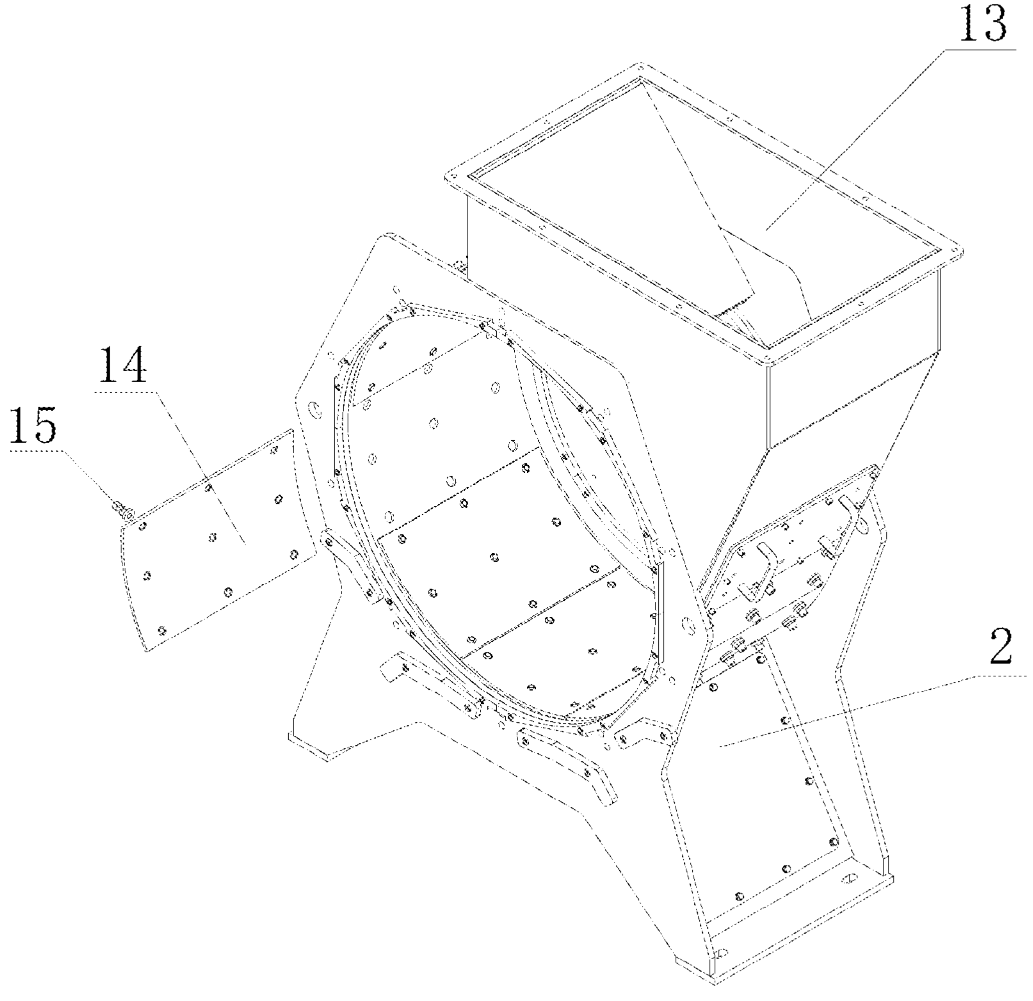
FIG. 3 is a schematic structural diagram of a feeding seat.
Figure 4:
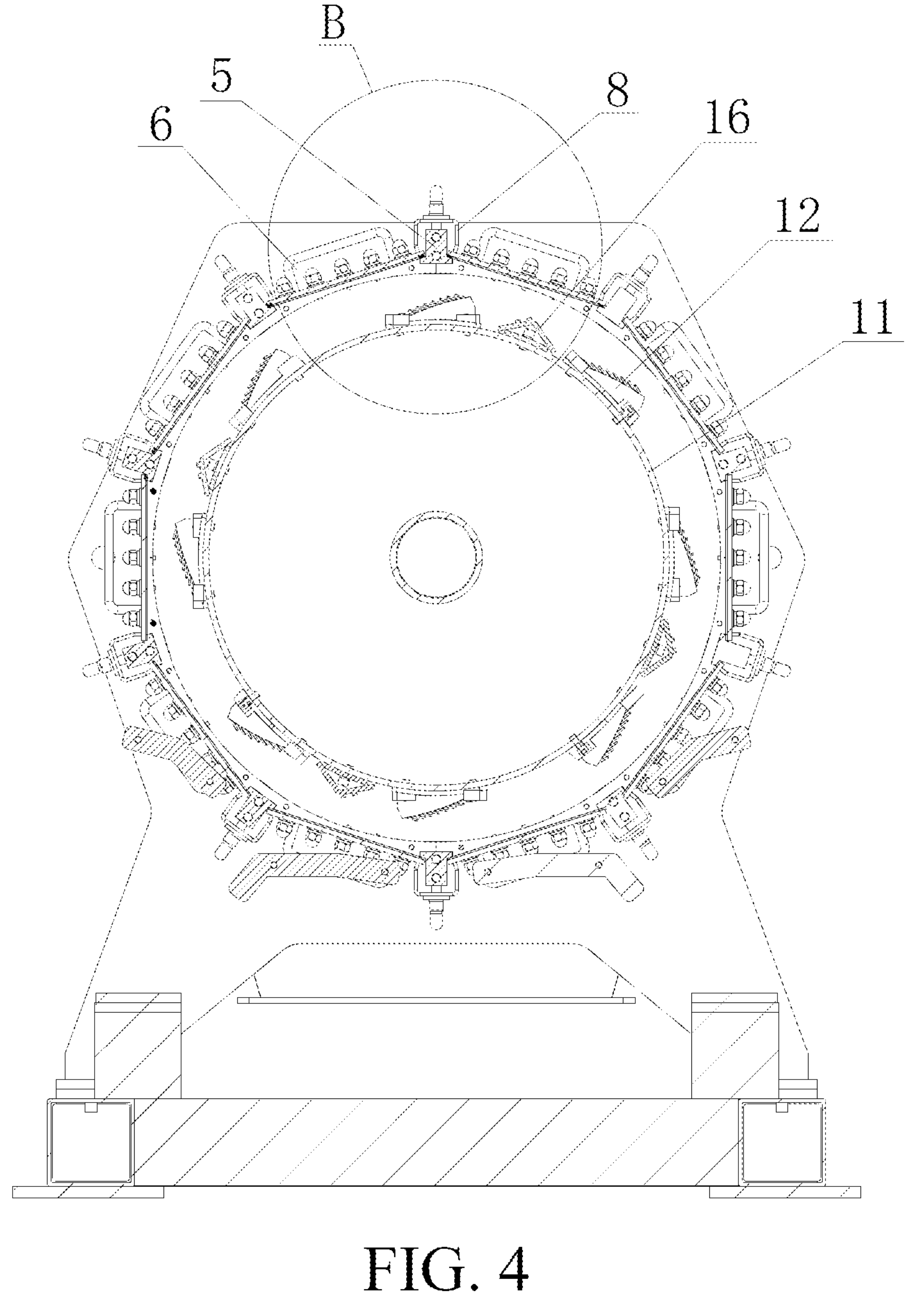
FIG. 4 is a sectional view taken in the direction A-A in FIG. 2.
Figure 5:
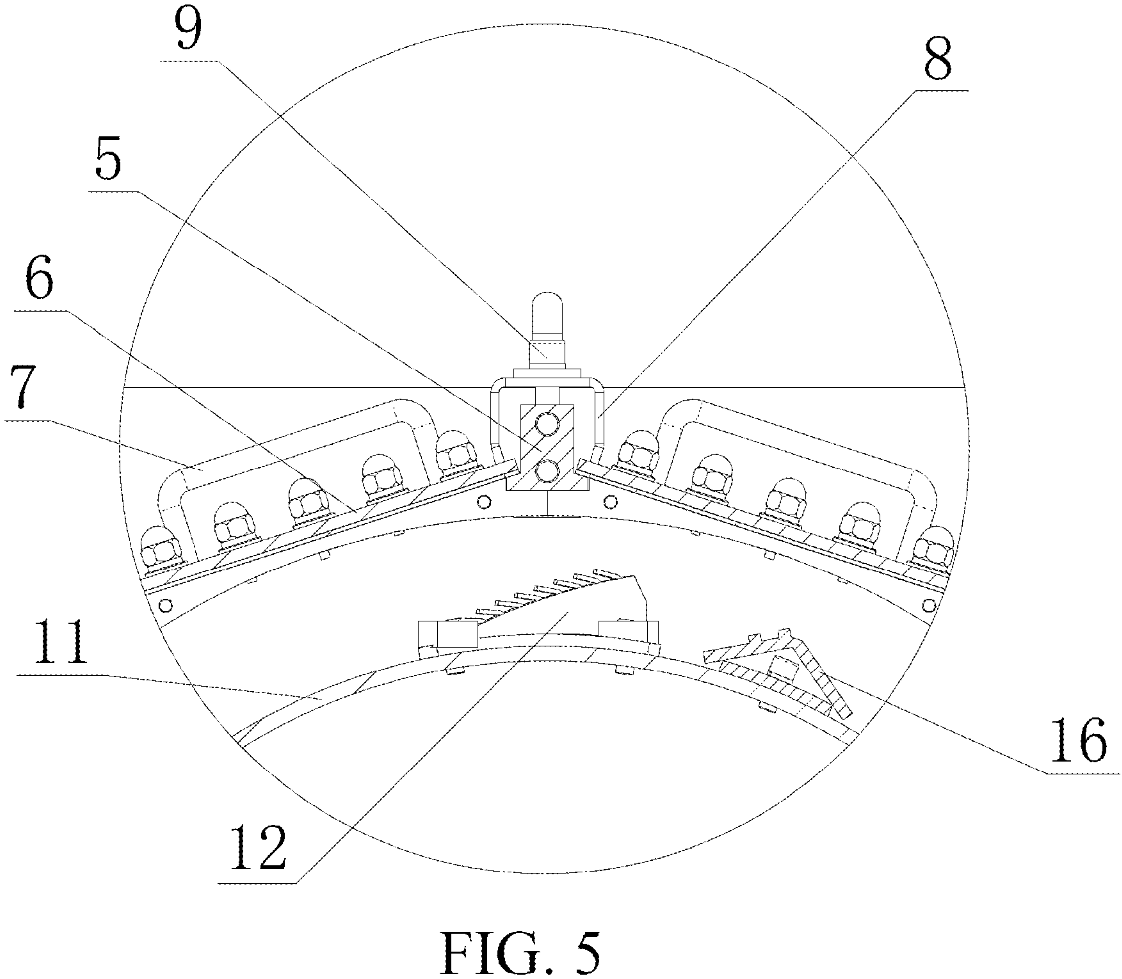
FIG. 5 is an enlarged view of a portion B in FIG. 4.
Figure 6:
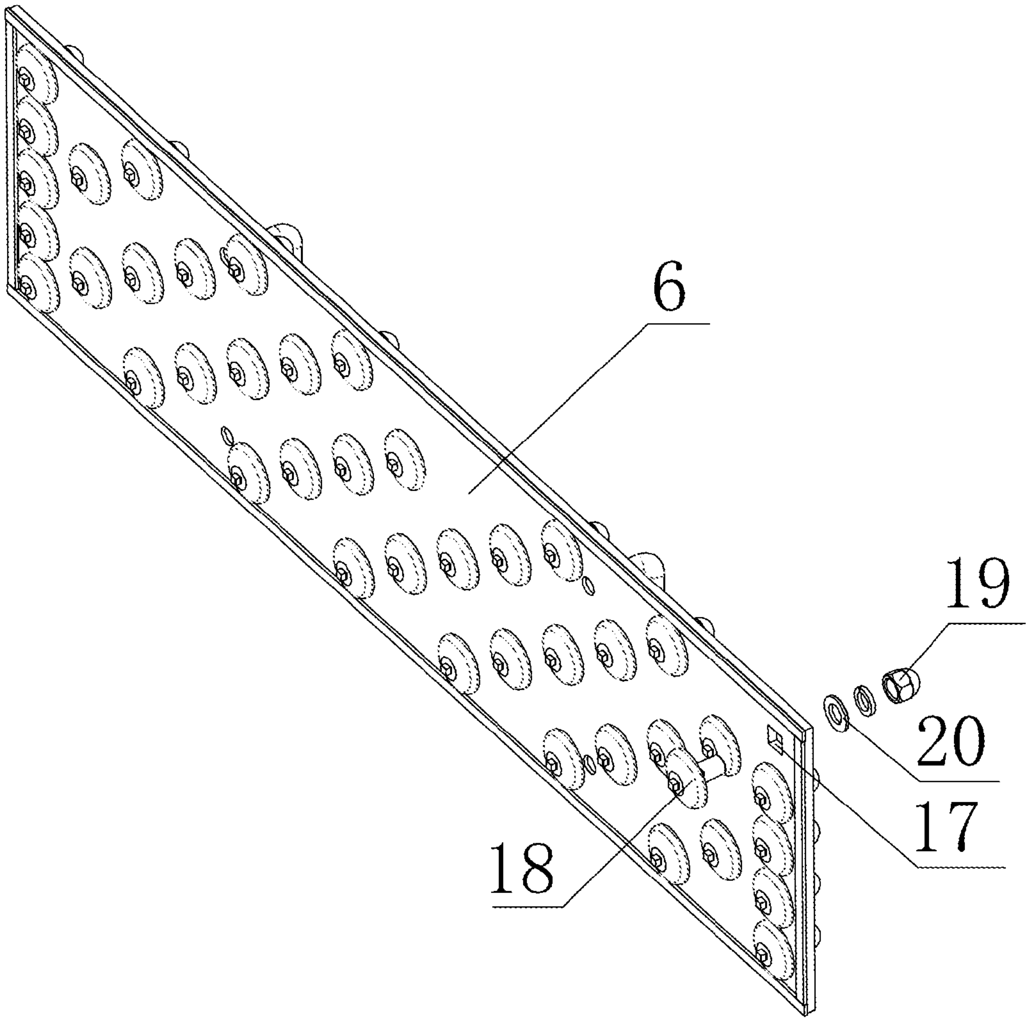
FIG. 6 is a schematic structural diagram of a fixed blade plate in one direction.
Figure 7:
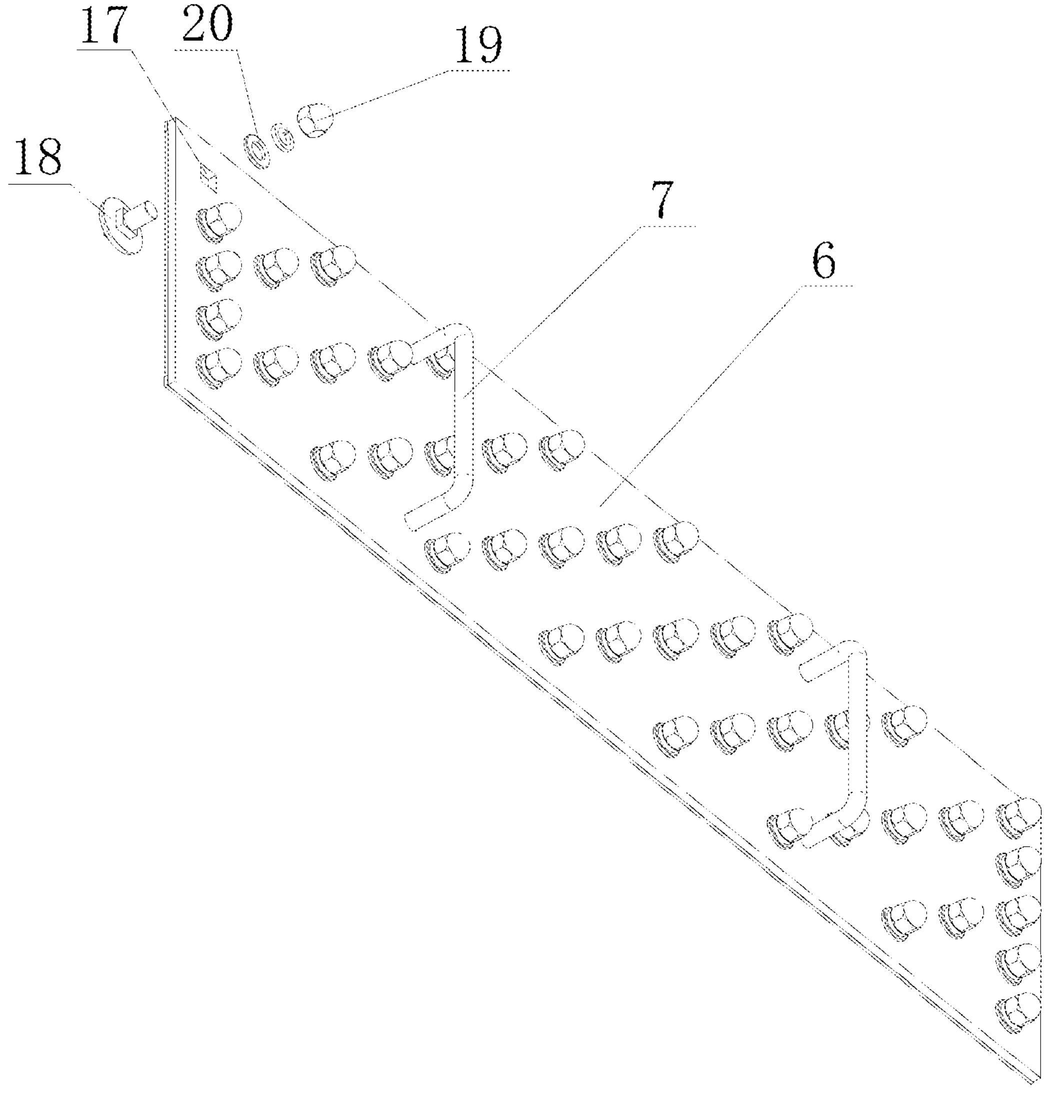
FIG. 7 is a schematic structural diagram of a fixed blade plate in another direction.
Figure 8:
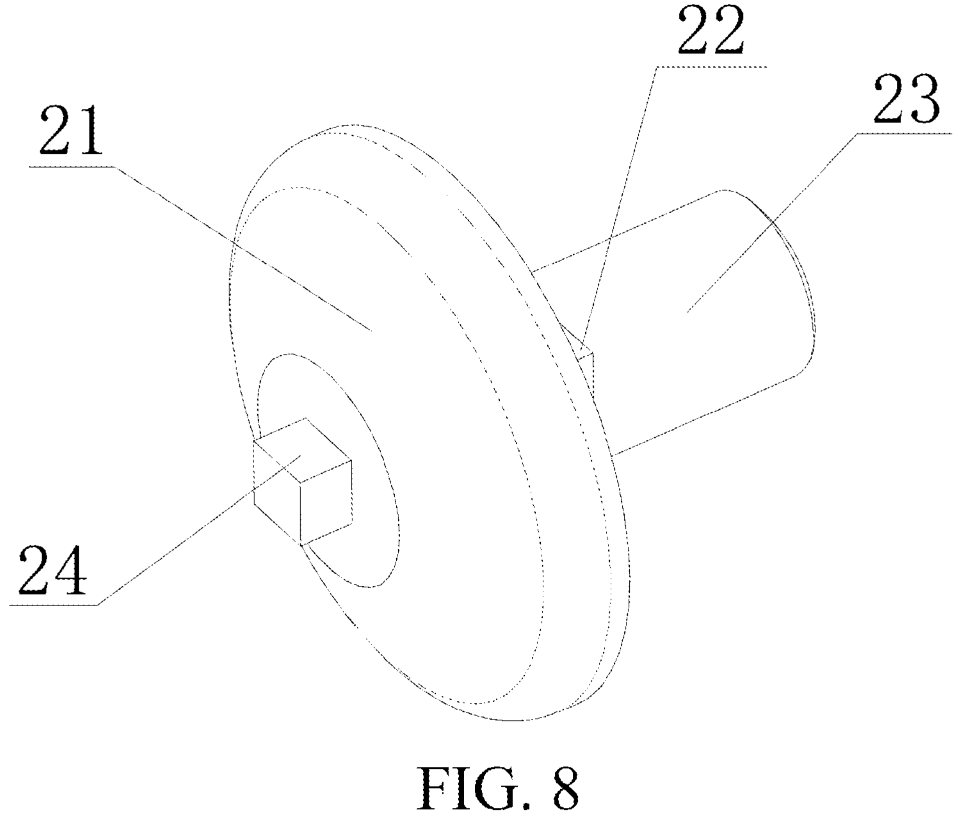
FIG. 8 is a schematic structural diagram of a fixed blade.

As shown in FIG. 1 to FIG. 8, a label removing machine includes a base 1, and a supporting seat 25 and a feeding seat 2 are disposed on the base 1. An outer cylinder is disposed between the feeding seat 2 and the supporting seat 25. A rotary drum 11 is disposed in the outer cylinder. A motor 3 for driving the rotary drum 11 to rotate is disposed on the base 1. An annular space is formed between the outer cylinder and the rotary drum 11. Moving blade components 12 and stirring battens 16 are disposed on an outer wall of the rotary drum 11. The cross section of each of the stirring battens 16 is triangular, and the stirring battens 16 are disposed in the axial direction of the rotary drum 11. The feeding seat 2 is provided with a feeding chamber and a feeding inlet 13 connected to the feeding chamber. Wear-resistant plates 14 are detachably connected to an inner wall of the feeding chamber. The wear-resistant plates 14 are connected to the inner wall of the feeding chamber through second bolts 15. The wear-resistant plates 14 cover the inner wall of the feeding chamber, and are detachably connected to the inner wall of the feeding chamber, so that the wear-resistant plates are convenient to replace.

The outer cylinder includes a supporting frame, and a plurality of fixed blade plates 6 are detachably connected to the supporting frame in the circumferential direction. The fixed blade plates 6 are each of a rectangular plate structure. The supporting frame includes two end plates 4. A plurality of cross beams 5 parallel to one another are disposed between the two end plates 4. The fixed blade plates 6 are connected between two immediately adjacent cross beams 5. Fixing mechanisms for fixing the fixed blade plates 6 are connected to the cross beams 5. Two sides of the cross beams 5 are respectively provided with connecting flanges, and one ends of the fixed blade plates 6 abut against the connecting flanges. Each of the fixing mechanisms includes a batten 8 and first bolts 9 for connecting the batten 8 to the corresponding cross beam 5. The cross section of each of the battens 8 is in a "U" shape. The battens 8 are provided with through holes allowing the first bolts 9 to penetrate through. The cross beams 5 are provided with threaded holes for connection to the first bolts 9. The first bolts 9 penetrate through the through holes provided in the battens 8 and are connected to the threaded holes in the cross beams 5. The battens 8 press one ends of the fixed blade plates 6 against the connecting flanges. Second install handles 10 are disposed on the battens 8.

A plurality of fixed blade components are detachably connected to the fixed blade plates 6. Each of the fixed blade components includes a fixed blade 18 and a cap nut 19. The fixed blade 18 includes a main body 21, a positioning platform 22 disposed on one side of the main body 21, and a cutter bit 24 disposed on the other side of the main body 21. The cutter bits 24 are each of a rectangular parallelepiped structure. Studs 23 are disposed on the positioning platforms 22. Positioning through groove 17 matching the positioning platforms 22 are provided in the fixed blade plates 6.

The positioning platforms 22 are connected to the positioning through grooves 17. The main bodies 21 are located on one sides of the fixed blade plates 6, and the cap nuts 19 are connected to the studs 23 on the other sides of the fixed blade plates 6. The main bodies 21 are each in a disk shape, and the sides, close to the cutter bits, of the main bodies 21 are spherical or quasi-spherical. A spacer 20 is further provided between each of the cap nuts 19 and the corresponding fixed blade plate 6. First install handles 7 are disposed on the fixed blade plates 6. The cross sections of the positioning platforms 22 and the positioning through grooves 17 are respectively square.

In the present invention, a modular design concept is adopted for the outer cylinder: each fixed blade plate and the fixed blade components connected thereto form a module, so that when the fixed blade components need to be replaced, the whole module is directly replaced without replacing the fixed blade components one by one. Therefore, the replacement efficiency is greatly improved, the time required for replacement is shortened, and replacement is convenient. In practical use of a label removing machine, because the rotary drum rotates in one direction, operation is conducted through one sides of the fixed blade components, and the fixed blade components are generally unilaterally worn, that is, one sides of the fixed blade components are heavily worn, while the other sides are almost not worn. In order to prolong the service life of the fixed blade components and reduce the replacement frequency of the fixed blade components, in the use process of the present invention, when one sides of the fixed blade components are heavily worn, the fixed blade plates may be horizontally rotated by 180 degrees, and the less worn sides of the fixed blade components continue to be used for operation, thereby effectively prolonging the service life of the fixed blade components and reducing the replacement frequency of the fixed blade components. The modular design concept of the present invention greatly facilitates the above operation.

Finally, it is to be noted that the above is only a preferred embodiment of the present invention and is not intended to limit the present invention. Although the present invention has been described in detail with reference to the foregoing embodiments, it will be appreciated by a person skilled in the art that modifications may still be made to the technical solutions described in the above-mentioned embodiments, or equivalents may be substituted for some of the technical features thereof, and any modifications, equivalent substitutions, improvements, etc. made within the spirit and principles of the present invention shall fall within the scope of the present invention.

I claim:

1. A label removing machine, comprising a base, a feeding seat and a supporting seat being disposed on the base, an outer cylinder being disposed between the feeding seat and the supporting seat, a rotary drum being disposed in the outer cylinder, moving blade components being disposed on an outer wall of the rotary drum, wherein the outer cylinder comprises a supporting frame, a plurality of fixed blade plates are detachably connected to the supporting frame in a circumferential direction, and a plurality of fixed blade components are detachably connected to the fixed blade plates;

stirring battens are disposed on the outer wall of the rotary drum, a cross section of each of the stirring battens is triangular, and the stirring battens are disposed in the axial direction of the rotary drum.

2. The label removing machine of claim 1, wherein the supporting frame comprises two end plates, a plurality of cross beams parallel to one another are disposed between the two end plates, each of the fixed blade plates is connected between two immediately adjacent cross beams, and fixing mechanisms for fixing the fixed blade plates are connected to the cross beams.

3. The label removing machine of claim 2, wherein each of the fixing mechanisms comprises a batten and first bolts for connecting the batten to the corresponding cross beam, and a cross section of the batten is in a "U" shape, the battens are provided with through holes allowing the first bolts to penetrate through, the cross beams are provided with threaded holes for connection to the first bolts, and the first bolts penetrate through the through holes provided in the battens and are connected to the threaded holes in the cross beams.

4. The label removing machine of claim 3, wherein second install handles are disposed on the battens.

5. The label removing machine of claim 1, wherein the feeding seat is provided with a feeding chamber and a feeding inlet connected to the feeding chamber, and wear-resistant plates are detachably connected to an inner wall of the feeding chamber.

6. The label removing machine of claim 5, wherein the wear-resistant plates are connected to the inner wall of the feeding chamber through second bolts.

7. The label removing machine of claim 1, wherein each of the fixed blade components comprises a fixed blade and a cap nut, the fixed blade comprising a main body, a positioning platform being disposed on one side of the main body, a cutter bit being disposed on the other side of the main body, a stud being disposed on the positioning platforms, a positioning through groove matching the positioning platform is provided in the fixed blade plates, the positioning platforms being connected to the positioning through grooves, the main bodies being located on one sides of the fixed blade plates, and the cap nuts being connected to the studs on the other sides of the fixed blade plates.

8. The label removing machine of claim 7, wherein the cutter bits are each of a rectangular parallelepiped structure.

9. The label removing machine of claim 7, wherein first install handles are disposed on the fixed blade plates.

10. The label removing machine of claim 6, wherein the wear-resistant plates are connected to the inner wall of the feeding chamber in the circumferential direction.

11. The label removing machine of claim 9, wherein the positioning through grooves are each of a square hole.

12. The label removing machine of claim 11, wherein a cross section area of the square hole is greater than that of each stud to allow the corresponding stud to penetrate through.

13. The label removing machine of claim 11, wherein the positioning platforms are each of a square structure.

14. The label removing machine of claim 13, wherein a cross section area of the square hole matches that of the square structure to allow the corresponding positioning platform to embed therein.

15. The label removing machine of claim 14, wherein each of the fixed blade components further comprises a spacer disposed between each of the cap nuts and the fixed blade plate.

16. The label removing machine of claim 15, wherein a size of the spacer is greater than cross section area of the square hole.

17. The label removing machine of claim 7, wherein the main body is in a disk shape, and a side, close to the cutter bit, of the main body is spherical or quasi-spherical.

* * * * *